(12) United States Patent
Ghosh et al.

(10) Patent No.: US 9,830,724 B2
(45) Date of Patent: Nov. 28, 2017

(54) DETECTING REAL ESTATE VACANCIES USING SATELLITE IMAGERY

(71) Applicant: MasterCard International Incorporated, Purchase, NY (US)

(72) Inventors: Debashis Ghosh, Charlotte, NC (US); Lavern Gilliard, Mount Vernon, NY (US); Justin X. Howe, San Francisco, CA (US)

(73) Assignee: Mastercard International Incorporated, Purchase, NY (US)

( * ) Notice: Subject to any disclaimer, the term of this patent is extended or adjusted under 35 U.S.C. 154(b) by 442 days.

(21) Appl. No.: 14/549,997

(22) Filed: Nov. 21, 2014

(65) Prior Publication Data

US 2016/0148406 A1    May 26, 2016

(51) Int. Cl.
| | | |
|---|---|---|
| *G06K 9/00* | (2006.01) | |
| *G06T 11/60* | (2006.01) | |
| *G06Q 10/10* | (2012.01) | |
| *G06Q 50/16* | (2012.01) | |
| *G06F 3/00* | (2006.01) | |

(52) U.S. Cl.
CPC .............. *G06T 11/60* (2013.01); *G06Q 10/10* (2013.01); *G06Q 50/16* (2013.01)

(58) Field of Classification Search
USPC ....... 382/100, 102–103, 106, 155, 157, 168, 382/173, 181, 189, 199, 219, 232, 254, 382/274, 276, 286–299, 305, 312; 701/532; 715/848, 738; 705/26.61, 4
See application file for complete search history.

(56) References Cited

U.S. PATENT DOCUMENTS

| | | |
|---|---|---|
| 5,555,512 A | 9/1996 | Imai et al. |
| 8,457,796 B2 | 6/2013 | Thind |
| 8,743,198 B2 | 6/2014 | Padmanabh et al. |
| 2009/0132316 A1* | 5/2009 | Florance ............... G06Q 30/06 701/532 |
| 2011/0115910 A1 | 5/2011 | Brackney |
| 2012/0287245 A1 | 11/2012 | Holland et al. |
| 2013/0010103 A1 | 1/2013 | Ihara et al. |
| 2013/0201290 A1 | 8/2013 | Holland et al. |
| 2013/0254670 A1* | 9/2013 | Eraker ................. G06Q 30/00 715/738 |

(Continued)

*Primary Examiner* — Seyed Azarian
(74) *Attorney, Agent, or Firm* — Armstrong Teasdale LLP

(57) ABSTRACT

A computer-implemented method for detecting real estate vacancies using satellite imagery is described. The method is implemented using a computing device in communication with a memory. The method includes receiving, by the computing device, a first location identifier that identifies a first real property location. The method additionally includes retrieving, by the computing device, a first satellite image of the first real property location. Additionally, the method includes retrieving, by the computing device, a second satellite image of the first real property location. The method additionally includes generating, by the computing device, a compound image of the first real property location by overlaying the second satellite image over the first satellite image. Additionally, the method includes providing the compound image to a user interface, wherein the compound image provides an indication of one or more vacant portions of the first real property location.

20 Claims, 12 Drawing Sheets

(56) References Cited

U.S. PATENT DOCUMENTS

| | | | |
|---|---|---|---|
| 2014/0019302 A1* | 1/2014 | Meadow | G06K 9/32 |
| | | | 705/26.61 |
| 2014/0072211 A1 | 3/2014 | Kovesi et al. | |
| 2014/0089811 A1* | 3/2014 | Meadow | G06T 17/05 |
| | | | 715/738 |
| 2014/0195275 A1* | 7/2014 | Pershing | G06Q 10/06 |
| | | | 705/4 |
| 2014/0210853 A1 | 7/2014 | Sasao et al. | |
| 2014/0210859 A1 | 7/2014 | Ihara et al. | |
| 2014/0211985 A1 | 7/2014 | Polese et al. | |
| 2014/0214606 A1 | 7/2014 | Ihara et al. | |
| 2014/0293032 A1 | 10/2014 | Gontina | |
| 2015/0040072 A1* | 2/2015 | Gontowski | G06Q 30/08 |
| | | | 715/848 |

\* cited by examiner

DETECTING REAL ESTATE VACANCIES USING SATELLITE IMAGERY

BACKGROUND

This description relates to obtaining vacancy information for real property locations and, more particularly, to obtaining such information from satellite images.

In determining whether to invest in a real property location, such as a strip mall or other commercial real estate property, a potential investor generally is interested in cash flow associated with the real property location. More specifically, the value of the real property location is based at least in part on whether tenants (e.g., merchants) are located at the real property location and generating money to pay rent. Accordingly, it is in a potential investor's interest for a real property location to be fully occupied by rent-paying tenants. Vacancy information for a real property location may be difficult to obtain without physically visiting the real property location and physically determining a number of tenants doing business in the real property location. Further, an investor may need to make repeated physical visits in order to determine a trend in the vacancies for the real property location and/or the surrounding area.

BRIEF DESCRIPTION OF THE DISCLOSURE

In one aspect, a computer-implemented method for detecting real estate vacancies using satellite imagery is provided. The method is implemented using a computing device in communication with a memory. The method includes receiving, by the computing device, a first location identifier that identifies a first real property location. The method additionally includes retrieving, by the computing device, a first satellite image of the first real property location. Additionally, the method includes retrieving, by the computing device, a second satellite image of the first real property location. The method additionally includes generating, by the computing device, a compound image of the first real property location by overlaying the second satellite image over the first satellite image. Additionally, the method includes providing the compound image to a user interface, wherein the compound image provides an indication of one or more vacant portions of the first real property location.

In another aspect, an imagery computing device for detecting real estate vacancies using satellite imagery is provided. The imagery computing device includes a processor coupled to a memory. The imagery computing device is configured to receive a first location identifier that identifies a first real property location. Additionally, the imagery computing device is configured to retrieve a first satellite image of the first real property location, retrieve a second satellite image of the first real property location, generate a compound image of the first real property location by overlaying the second satellite image over the first satellite image, and provide the compound image to a user interface, wherein the compound image provides an indication of one or more vacant portions of the first real property location.

In yet another aspect, a computer-readable storage medium having computer-executable instructions embodied thereon is provided. When executed by an imagery computing device having at least one processor coupled to a memory, the computer-executable instructions cause the imagery computing device to: receive a first location identifier that identifies a first real property location, retrieve a first satellite image of the first real property location, retrieve a second satellite image of the first real property location, generate a compound image of the first real property location by overlaying the second satellite image over the first satellite image, and provide the compound image to a user interface, wherein the compound image provides an indication of one or more vacant portions of the first real property location.

BRIEF DESCRIPTION OF THE DRAWINGS

FIG. 1 is a schematic diagram illustrating an example multi-party payment card industry system for enabling ordinary payment-by-card transactions in which merchants and card issuers do not necessarily have a one-to-one relationship.

FIG. 2 is a simplified block diagram of an example imagery system including a plurality of computing devices in accordance with one example embodiment of the present disclosure.

FIG. 3 is an expanded block diagram of an example embodiment of a server architecture of the imagery system including the plurality of computing devices in accordance with one example embodiment of the present disclosure.

FIG. 4 illustrates a configuration of a client system shown in FIGS. 2 and 3 in accordance with one example embodiment of the present disclosure.

FIG. 5 illustrates a configuration of a server system shown in FIGS. 2 and 3 in accordance with one example embodiment of the present disclosure.

FIG. 6 is a simplified satellite image of a real property location during daytime. The satellite image is utilized by the imagery system in one example embodiment of the present disclosure.

FIG. 7 is a simplified satellite image of the real property location of FIG. 6 during nighttime. The satellite image is utilized by the imagery system in one example embodiment of the present disclosure.

FIG. 8 is a simplified compound image that is generated by the imagery system using the satellite image of FIG. 6 and the satellite image of FIG. 7 in one example embodiment of the present disclosure.

FIG. 9 is a simplified infrared satellite image of the real property location of FIG. 6. The satellite image is utilized by the imagery system in one example embodiment of the present disclosure.

FIG. 10 is a diagram of a vacancy trend emerging in a geographic area that includes the real property location of FIG. 6 in one example embodiment of the present disclosure.

FIG. 11 is a flowchart of an example process implemented by the imagery system for detecting real estate vacancies using satellite imagery in one example embodiment of the present disclosure.

FIG. 12 is a diagram of components of one or more example computing devices that may be used in the imagery system shown in FIG. 2.

DETAILED DESCRIPTION OF THE DISCLOSURE

Figure 1:
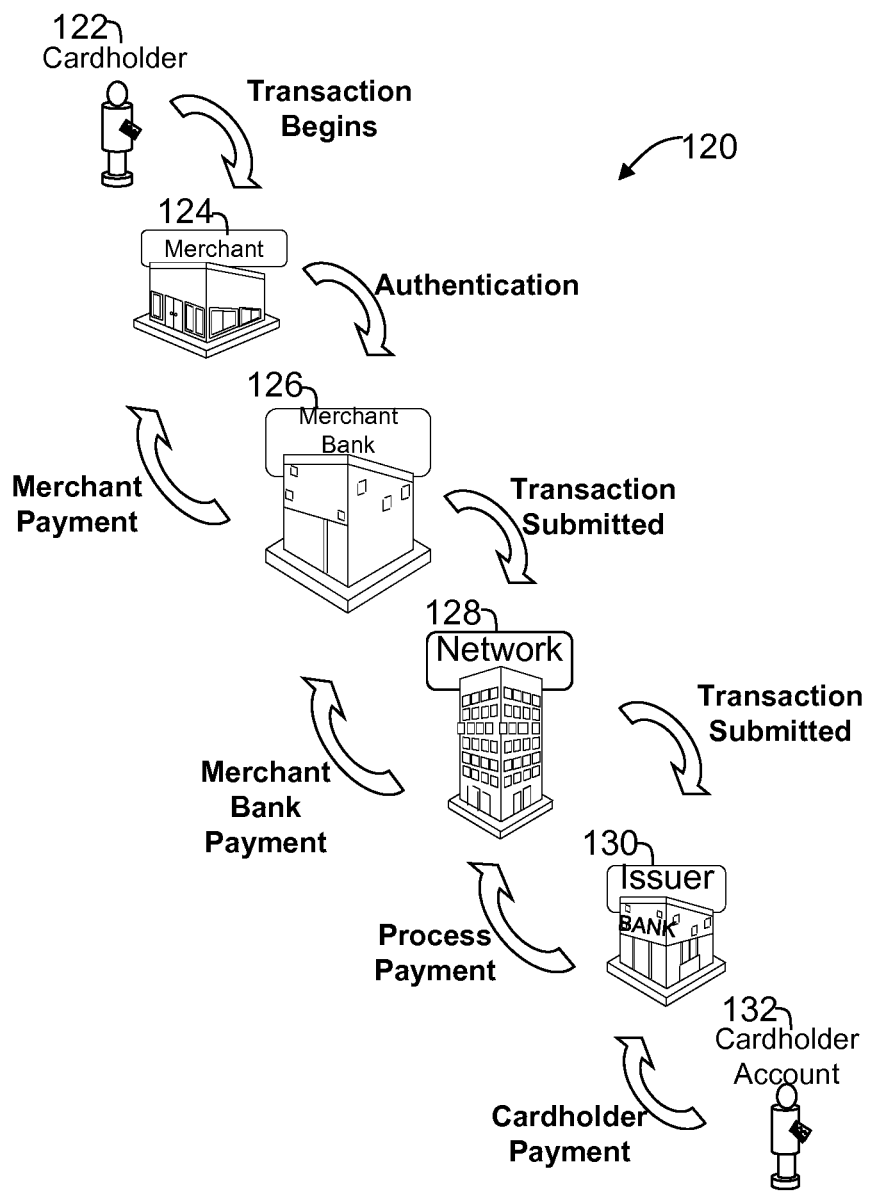
FIGS. 1-12 show example embodiments of the methods and systems described herein.

A potential investor in a real property location or someone looking to open a business within or near a real property location (collectively referred to herein as an "investor") may be interested in knowing how many vacancies exist within the real property location. The investor may also be interested in knowing the current vacancy trend for a selected real property location. As used herein, an investor is someone who may be a potential buyer of real property, or a bank that is considering making a loan to a potential buyer of real property or providing refinancing to a current owner. In addition, an investor may include someone interested in opening a business near a selected piece of real property or within the selected piece of real property.

For example, a bank may be considering making a loan to someone who is interested in purchasing a piece of commercial real estate such as a strip mall. Before agreeing to make such a loan, the bank may want to know how many vacancies exist within the strip mall. If, for example, eight stores are located within the strip mall, but only three of them have tenants and the other five are vacant, then the bank may not want to make such a loan. The bank may also want to know what the vacancy trend is for the strip mall. For example, the bank may want to know whether all of the vacancies at the strip mall occurred within the last month, or whether the stores have been vacant for a longer period of time.

The system described herein includes an imagery computing device configured to receive a location identifier such as an address that identifies a first real property location. The imagery computing device additionally retrieves a first satellite image of the first real property location, for example a satellite image taken during daylight hours. Further, the imagery computing device retrieves a second satellite image of the first real property location, for example during nighttime hours, so that artificial light (e.g., from signs and/or other lighting) emitted from the real property location is visible. Further, the imagery computing device generates a compound image of the first real property location by overlaying the second satellite image over the first satellite image, and causes the compound image to be displayed on a user interface. The displayed compound image indicates vacancies included within the first real property location, by showing both the structure of the real property location and areas where artificial light is emitted from the real property location. More specifically, given that areas of the real property location that do not emit light during nighttime hours are likely not occupied by merchants, the compound image thereby provides an indication of which portions or units of the real property location are likely vacant. As used herein, a satellite image is an image generated by any device from above a real property location. Accordingly, satellite images include images taken by aircraft and/or spacecraft.

In some implementations, the imagery computing device generates a time-lapse video from multiple satellite images of a geographic area that includes the first real property location over a period of time. The time-lapse video indicates a trend in vacancies for the geographic area. In some implementations, the imagery computing device additionally retrieves multiple infrared images indicating a trend in an amount of infrared energy radiated from the first property location over a time period of multiple days. If the amount of infrared energy remains substantially constant over the time period, then the real property location is likely to be occupied. In some implementations, the imagery computing device additionally accounts for an amount of solar energy absorbed by the real property location at different times during the time period, based on atmospheric conditions, time of day, a geographic location of the real property location, and/or a reflectivity of at least one surface (e.g., the roof) of the real property location.

In some implementations, the imagery computing device is in communication with a database of a payment network, and the imagery computing device retrieves transaction data associated with merchants located in the real property location. The transaction data may include dates of payment card transactions, and identifiers, including names and addresses, of merchants associated with the transactions. Accordingly, the imagery computing device may determine a number of merchants doing business at the real property location at various time periods and a frequency of payment card transactions ("payment transaction velocity") associated with each merchant. In some implementations, the imagery computing device confirms information associated with the images based on the transaction data. In some implementations, the imagery computing device determines a number of units in the real property location and compares a number of merchants associated with the real property location, based on the transaction data, to the number of units in the real property location.

While the description herein uses a strip mall as an example real property location, it should be understood that the systems and methods described herein would also work for other types of real property locations.

The methods and systems described herein may be implemented using computer programming or engineering techniques including computer software, firmware, hardware or any combination or subset thereof, wherein at least one technical effect is achieved by performing at least one of: (a) receiving, by a computing device, a first location identifier that identifies a first real property location; (b) retrieving, by the computing device, a first satellite image of the first real property location; (c) retrieving, by the computing device, a second satellite image of the first real property location; (d) generating, by the computing device, a compound image of the first real property location by overlaying the second satellite image over the first satellite image; and (e) providing the compound image to a user interface, wherein the compound image provides an indication of one or more vacant portions of the first real property location. The technical effects described herein apply to the technical field of obtaining vacancy information for real property locations from satellite images. The systems and methods described herein provide the technical advantage of using satellite images of real property locations during the daytime and during the nighttime to provide vacancy information regarding one or more real property locations to an investor. By overlaying the nighttime images and daytime images of the same real property location into a compound image, artificial light emitted from one or more portions of the real property location becomes apparent and provides an indication of whether each portion is occupied, for example by merchants. More specifically, the displayed compound image indicates vacancies included within a real property location, by showing both the structure of the real property location and areas where artificial light is emitted from the real property location. Given that areas of the real property location that do not emit light during nighttime hours are likely not occupied by merchants, the compound image thereby provides an indication of which portions or units of the real property location are likely vacant. Accordingly, the systems and methods provide occupancy information to an investor that would otherwise be unavailable without obtaining and combining satellite images as described herein.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

In one embodiment, a computer program is provided, and the program is embodied on a computer-readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party payment card system 120 for enabling ordinary payment-by-card transactions in which merchants and card issuers do not necessarily have a one-to-one relationship. The present disclosure relates to payment card system 120, such as a credit card payment system using the MasterCard® payment card system payment network 128 (also referred to as an "interchange" or "interchange network"). MasterCard® payment card system payment network 128 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In payment card system 120, a financial institution such as an issuer 130 issues a payment account card, such as a credit card account or a debit card account, to a cardholder 122, who uses the payment account card to tender payment for a purchase from a merchant 124. To accept payment with the payment account card, merchant 124 must normally establish an account with a financial institution that is part of the financial payment system. This financial institution is usually called the "merchant bank" or the "acquiring bank" or "acquirer bank" or simply "acquirer". When a cardholder 122 tenders payment for a purchase with a payment account card (also known as a financial transaction card), merchant 124 requests authorization from acquirer 126 for the amount of the purchase. The request may be performed over the telephone, but is usually performed through the use of a point-of-interaction terminal, which reads the cardholder's account information from the magnetic stripe on the payment account card and communicates electronically with the transaction processing computers of acquirer 126. Alternatively, acquirer 126 may authorize a third party to perform transaction processing on its behalf. In this case, the point-of-interaction terminal will be configured to communicate with the third party. Such a third party is usually called a "merchant processor" or an "acquiring processor."

Using payment card system payment network 128, the computers of acquirer 126 or the merchant processor will communicate with the computers of issuer 130, to determine whether the cardholder's account 132 is in good standing and whether the purchase is covered by the cardholder's available credit line or account balance. Based on these determinations, the request for authorization will be declined or accepted. If the request is accepted, an authorization code is issued to merchant 124.

When a request for authorization is accepted, the available credit line or available balance of cardholder's account 132 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 124 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For debit card transactions, when a request for authorization is approved by the issuer, the cardholder's account 132 is decreased. Normally, a charge is posted immediately to cardholder's account 132. The bankcard association then transmits the approval to the acquiring processor for distribution of goods/services, or information or cash in the case of an ATM.

After a transaction is captured, the transaction is settled between merchant 124, acquirer 126, and issuer 130. Settlement refers to the transfer of financial data or funds between the merchant's account, acquirer 126, and issuer 130 related to the transaction. Usually, transactions are captured and accumulated into a "batch," which is settled as a group.

Figure 2:
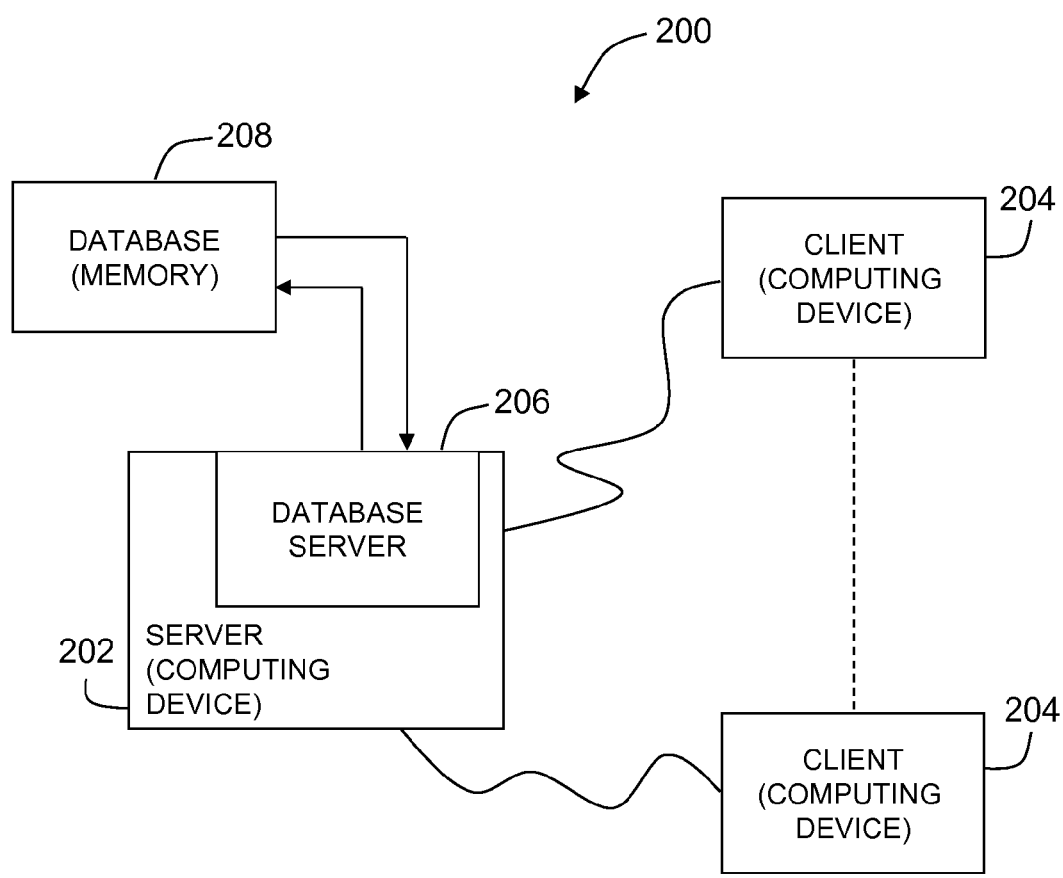

FIG. 2 is a simplified block diagram of an example imagery system 200 in accordance with one embodiment of the present disclosure. In the example embodiment, system 200 includes an imagery computing device 202 and a plurality of client subsystems, also referred to as client systems 204 or client computing devices, connected to imagery computing device 202. In one embodiment, client systems 204 are computers including a web browser, such that imagery computing device 202 is accessible to client systems 204 using the Internet. Client systems 204 are interconnected to the Internet through many interfaces including a network, such as a local area network (LAN) and/or a wide area network (WAN), dial-in connections, cable modems, wireless-connections, and special high-speed ISDN lines. Client systems 204 may be any device capable of interconnecting to the Internet including a web-based phone, personal digital assistant (PDA), or other web-connectable equipment. A database server 206 is connected to a database 208 containing information on a variety of matters, as described below in greater detail. In one embodiment, database 208 is stored on imagery computing device 202 and may be accessed by potential users at one of client systems 204 by logging onto imagery computing device 202 through one of client systems 204. In any alternative embodiment, database 208 is stored remotely from imagery computing device 202 and may be non-centralized. Imagery computing device 202 could be any type of computing device configured to perform the steps described herein.

As discussed below, satellite images indexed by locations of real property locations (e.g., addresses) and historical payment card transaction data associated with merchants doing business at real property locations, including merchant account numbers, merchant locations, merchant names, transaction amounts, and transaction dates are stored within database 208.

Figure 3:
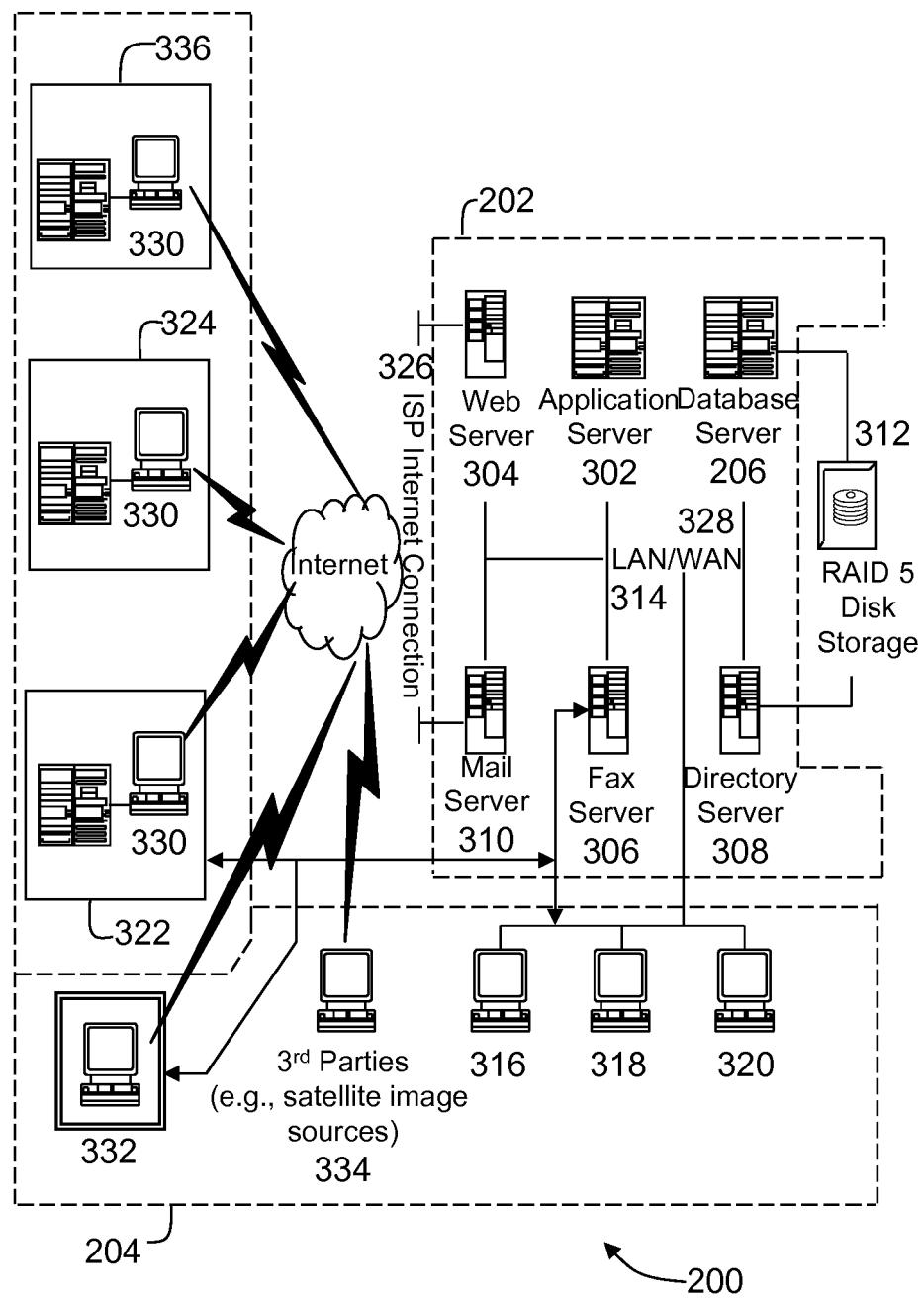

FIG. 3 is an expanded block diagram of an example embodiment of a server architecture of imagery system 200 in accordance with one embodiment of the present disclosure. Imagery system 200 includes imagery computing device 202 and client systems 204. Imagery computing device 202 further includes database server 206, an application server 302, a web server 304, a fax server 306, a directory server 308, and a mail server 310. A disk storage unit 312 is coupled to database server 206 and directory server 308. Servers 206, 302, 304, 306, 308, and 310 are coupled in a local area network (LAN) 314. In addition, a system administrator's workstation 316, a user workstation 318, and a supervisor's workstation 320 are coupled to LAN 314. Alternatively, workstations 316, 318, and 320 are coupled to LAN 314 using an Internet link or are connected through an Intranet.

Each workstation, 316, 318, and 320, is a personal computer having a web browser. Although the functions performed at the workstations typically are illustrated as being performed at respective workstations 316, 318, and 320, such functions can be performed at one of many personal computers coupled to LAN 314. Workstations 316, 318, and 320 are illustrated as being associated with separate functions only to facilitate an understanding of the different types of functions that can be performed by individuals having access to LAN 314.

Imagery computing device 202 is configured to be communicatively coupled to various entities, including acquirers 322 and issuers 324, and to third parties, e.g., satellite image sources, 334 using an Internet connection 326. Server system 202 is also communicatively coupled with one or more merchants 336. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 328, local area network 314 could be used in place of WAN 328.

In the example embodiment, any authorized individual or entity having a workstation 330 may access system 200. At least one of the client systems includes a manager workstation 332 located at a remote location. Workstations 330 and 332 include personal computers having a web browser. Also, workstations 330 and 332 are configured to communicate with imagery computing device 202. Furthermore, fax server 306 communicates with remotely located client systems, including a client system 332, using a telephone link. Fax server 306 is configured to communicate with other client systems 316, 318, and 320 as well.

Figure 4:
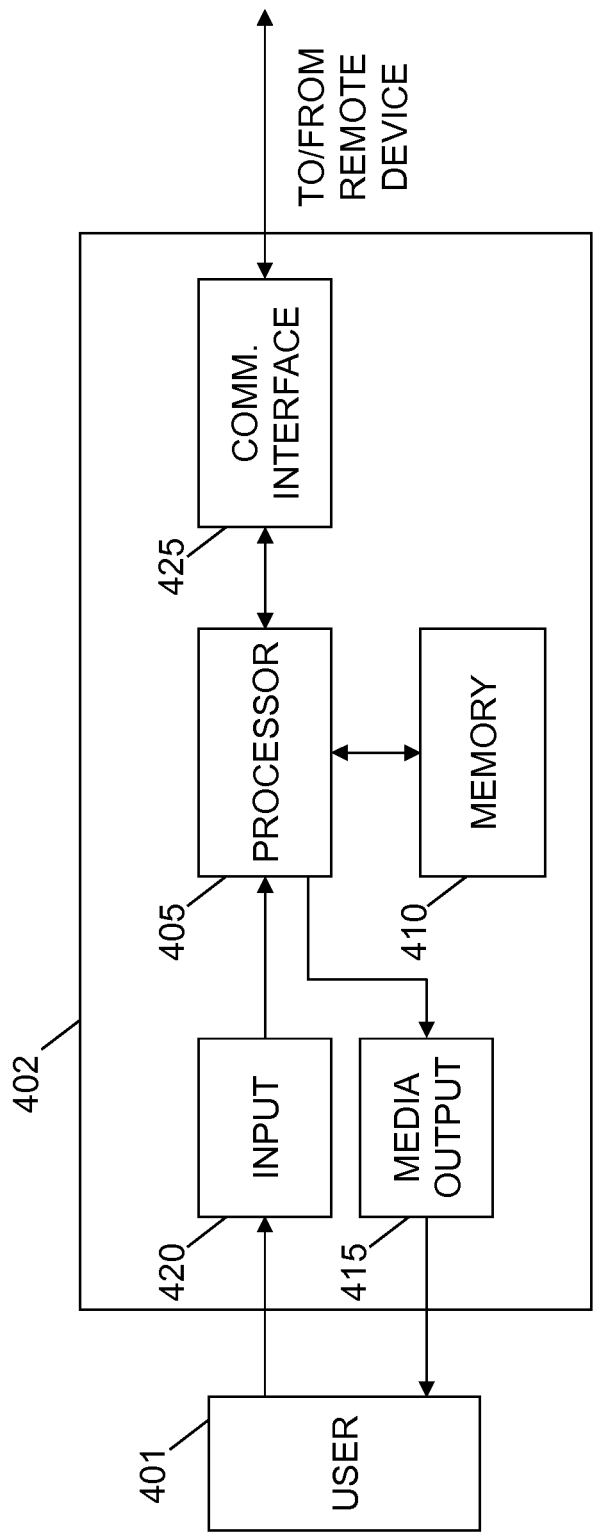

FIG. 4 illustrates an example configuration of a cardholder computing device 402 operated by a cardholder 401. Cardholder computing device 402 may include, but is not limited to, client systems ("client computing devices") 204, 316, 318, and 320, workstation 330, and manager workstation 332 (shown in FIG. 3).

Cardholder computing device 402 includes a processor 405 for executing instructions. In some embodiments, executable instructions are stored in a memory area 410. Processor 405 may include one or more processing units (e.g., in a multi-core configuration). Memory area 410 is any device allowing information such as executable instructions and/or other data to be stored and retrieved. Memory area 410 may include one or more computer-readable media.

Cardholder computing device 402 also includes at least one media output component 415 for presenting information to cardholder 401. Media output component 415 is any component capable of conveying information to cardholder 401. In some embodiments, media output component 415 includes an output adapter such as a video adapter and/or an audio adapter. An output adapter is operatively coupled to processor 405 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, cardholder computing device 402 includes an input device 420 for receiving input from cardholder 401. Input device 420 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 415 and input device 420.

Cardholder computing device 402 may also include a communication interface 425, which is communicatively couplable to a remote device such as server system 202 or a web server operated by a merchant. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to cardholder 401 via media output component 415 and, optionally, receiving and processing input from input device 420. A user interface may include, among other possibilities, a web browser and client application. Web browsers enable users, such as cardholder 401 or other user (e.g., an investor), to display and interact with media and other information typically embedded on a web page or a website from imagery computing device 202 or a web server associated with a merchant. For example, in some implementations, computing device 402 displays one or more satellite images, such as compound image 800, in a web browser or other user interface. A client application allows cardholder 401 or other user (e.g., an investor) to interact with a server application from imagery computing device 202 or a web server associated with a merchant.

Figure 5:
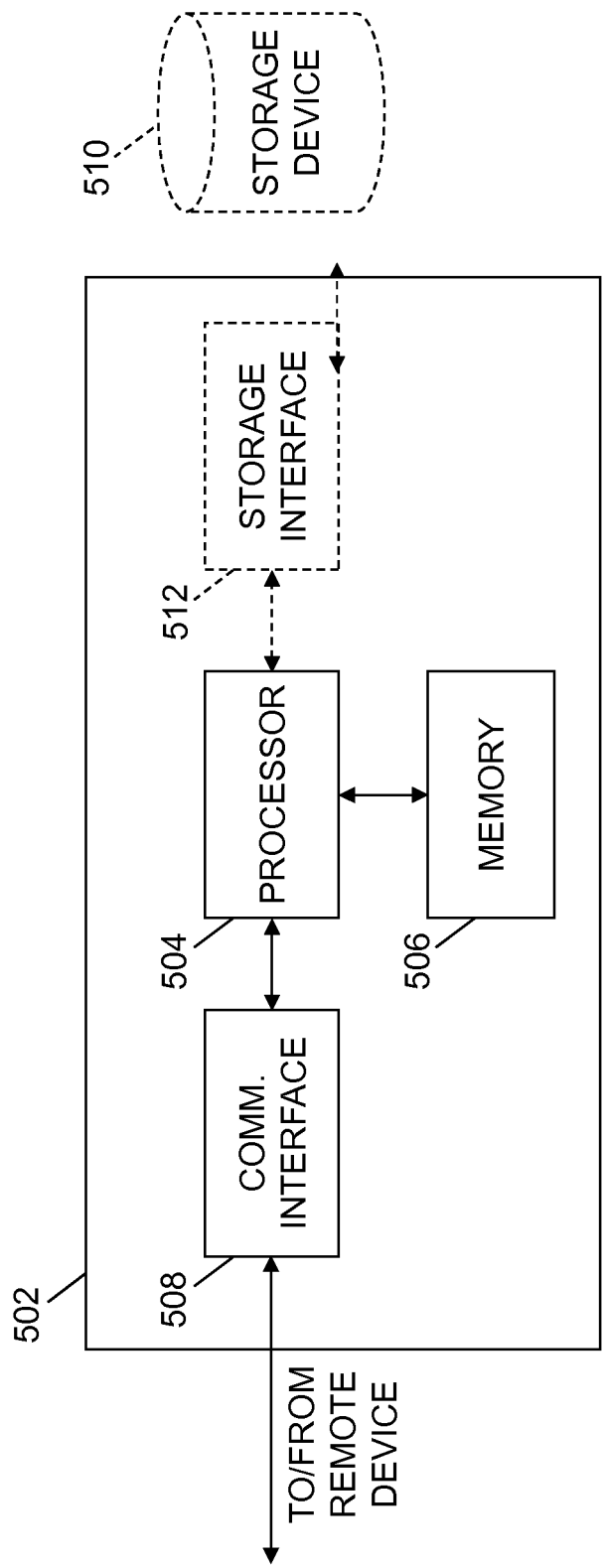

FIG. 5 illustrates an example configuration of a server computing device 502 such as imaging computing device 202 (shown in FIGS. 2 and 3). Server computing device 502 may include, but is not limited to, database server 206, application server 302, web server 304, fax server 306, directory server 308, and mail server 310.

Server computing device 502 includes a processor 504 for executing instructions. Instructions may be stored in a memory area 506, for example. Processor 504 may include one or more processing units (e.g., in a multi-core configuration).

Processor 504 is operatively coupled to a communication interface 508 such that server computing device 502 is capable of communicating with a remote device such as cardholder computing device 402 or another server computing device 502. For example, communication interface 508 may receive requests from client systems 204 via the Internet, as illustrated in FIGS. 2 and 3.

Processor 504 may also be operatively coupled to a storage device 510. Storage device 510 is any computer-operated hardware suitable for storing and/or retrieving data. In some embodiments, storage device 510 is integrated in server computing device 502. For example, server computing device 502 may include one or more hard disk drives as storage device 510. In other embodiments, storage device 510 is external to server computing device 502 and may be accessed by a plurality of server computing devices 502. For example, storage device 510 may include multiple storage units such as hard disks or solid state disks in a redundant array of inexpensive disks (RAID) configuration. Storage device 510 may include a storage area network (SAN) and/or a network attached storage (NAS) system.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory areas 410 and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
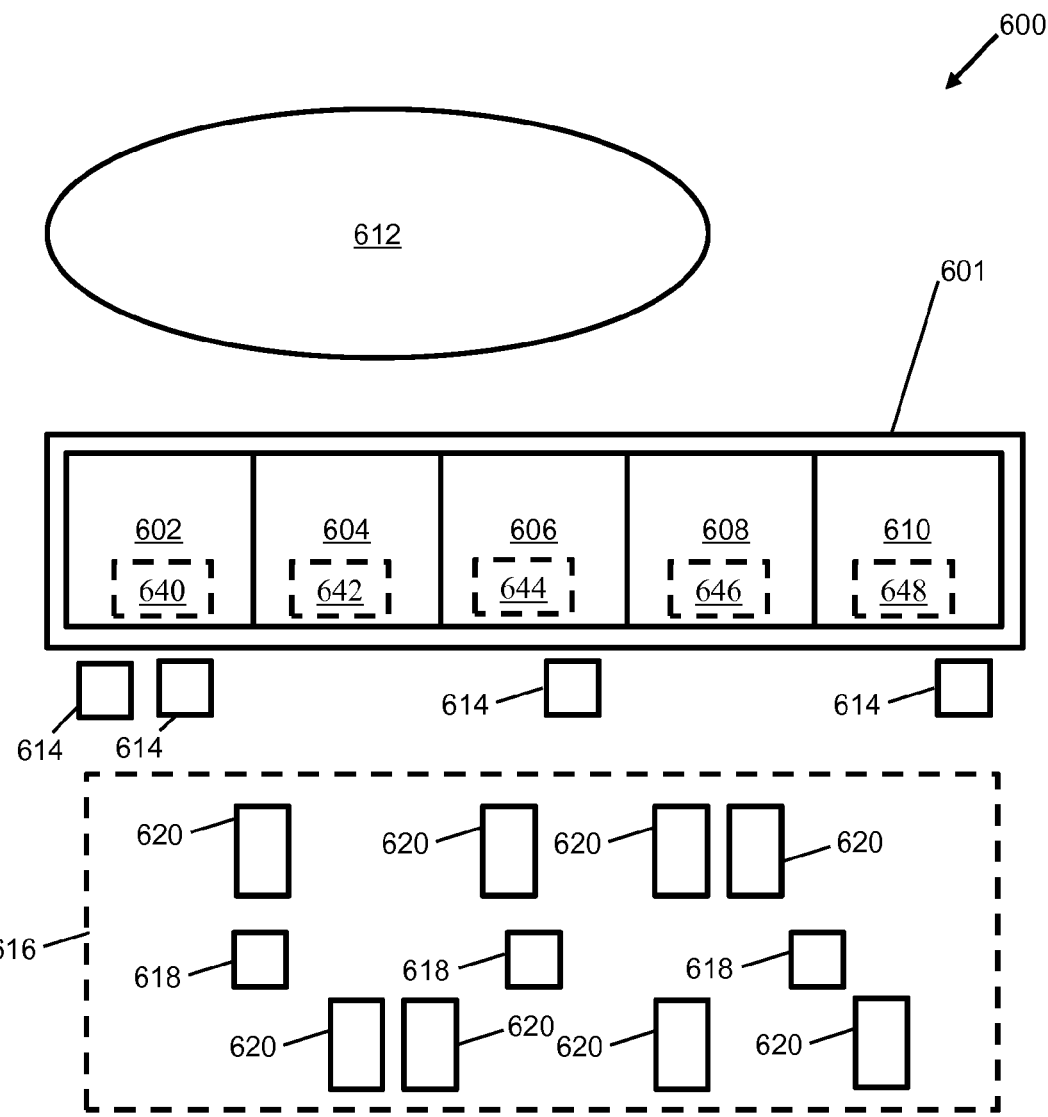

FIG. 6 is a simplified satellite image 600 of a real property location 601 during daytime (i.e., when the Sun is above the horizon). Imagery computing device 202 receives image 600 from a satellite image source 334 (FIG. 3) and stores image 600 in database 208 for later retrieval. In some implementations, imagery computing device 202 associates satellite images such as satellite image 600 with a location identifier (e.g., an address) of real property locations shown in the images. In some implementations, satellite image 600 is taken at noon, to reduce the amount of shadows that may be present if image 600 was taken at a different time during daylight hours. In this example, real property location 601 is a commercial real estate property. Even more specifically, real property location 601 is a strip mall that includes a first unit 602, a second unit 604, a third unit 606, a fourth unit 608, and a fifth unit 610. Accordingly, real property location 601 is capable of accommodating five merchants, including a first merchant 640, a second merchant 642, a third merchant 644, a fourth merchant 646, and a fifth merchant 648. Image 600 additionally includes other items that are visible during daylight, including a pond 612, trees 614, a parking lot 606, parking lot lights 618, and vehicles 620. Those skilled in the art of recognizing objects using remote sensing data will understand that vegetation such as trees can be identified using satellite images.

Figure 7:
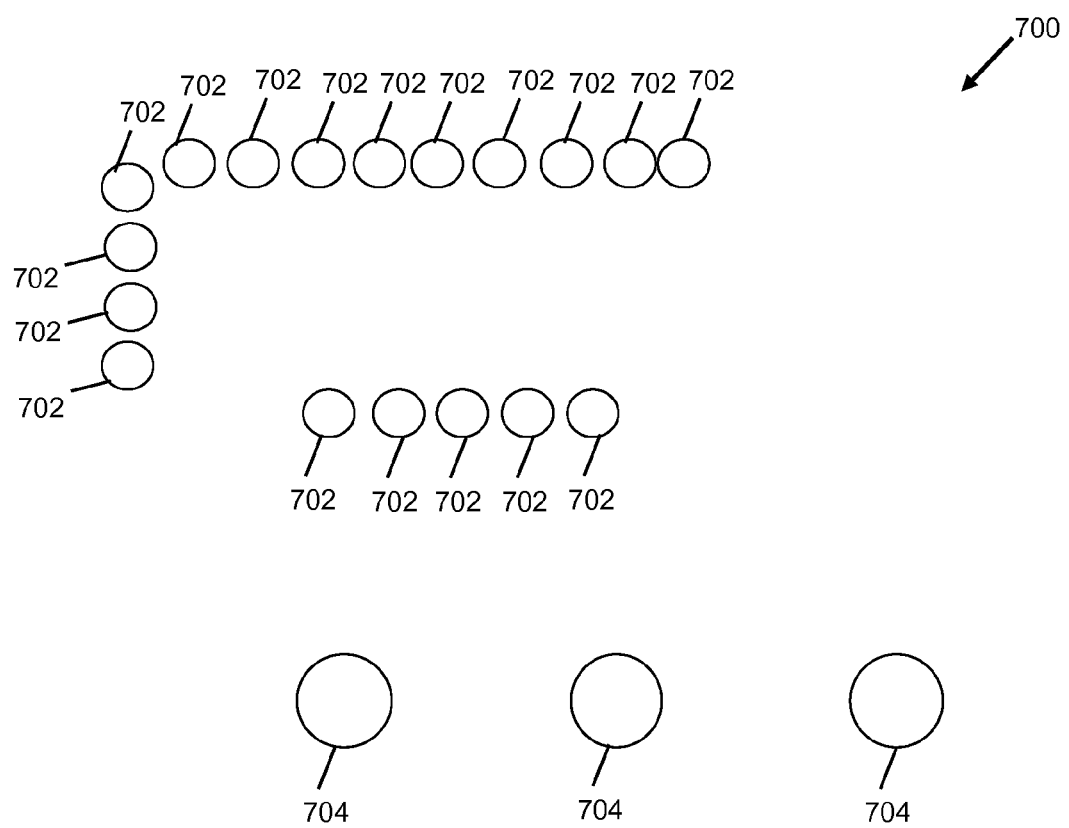

FIG. 7 is a simplified satellite image 700 of real property location 601 during nighttime (i.e., when the Sun is below the horizon). Imagery computing device 202 receives image 600 from a satellite image source 334 (FIG. 3) and stores image 600 in database 208 for later retrieval, in association with the address of real property location 601. In image 700, pond 612, trees 614, and parking lot 616 are not visible. However, light emitted from real property location 601 and parking lot lights 618 are visible as lights 702 and 704, respectively. Without image 600, it is unclear that trees 614 occlude some light 702 that may otherwise be visible in satellite image 700. Importantly, given that units that are not occupied or used by merchants generally do not emit light at night, image 700 provides an indication that are least a portion of real property location 601 is not being used by any merchants. When image 700 is overlaid on image 600, it is possible to determine which units 602, 604, 606, 608, and 610 are not used by merchants (i.e., vacant).

Figure 8:
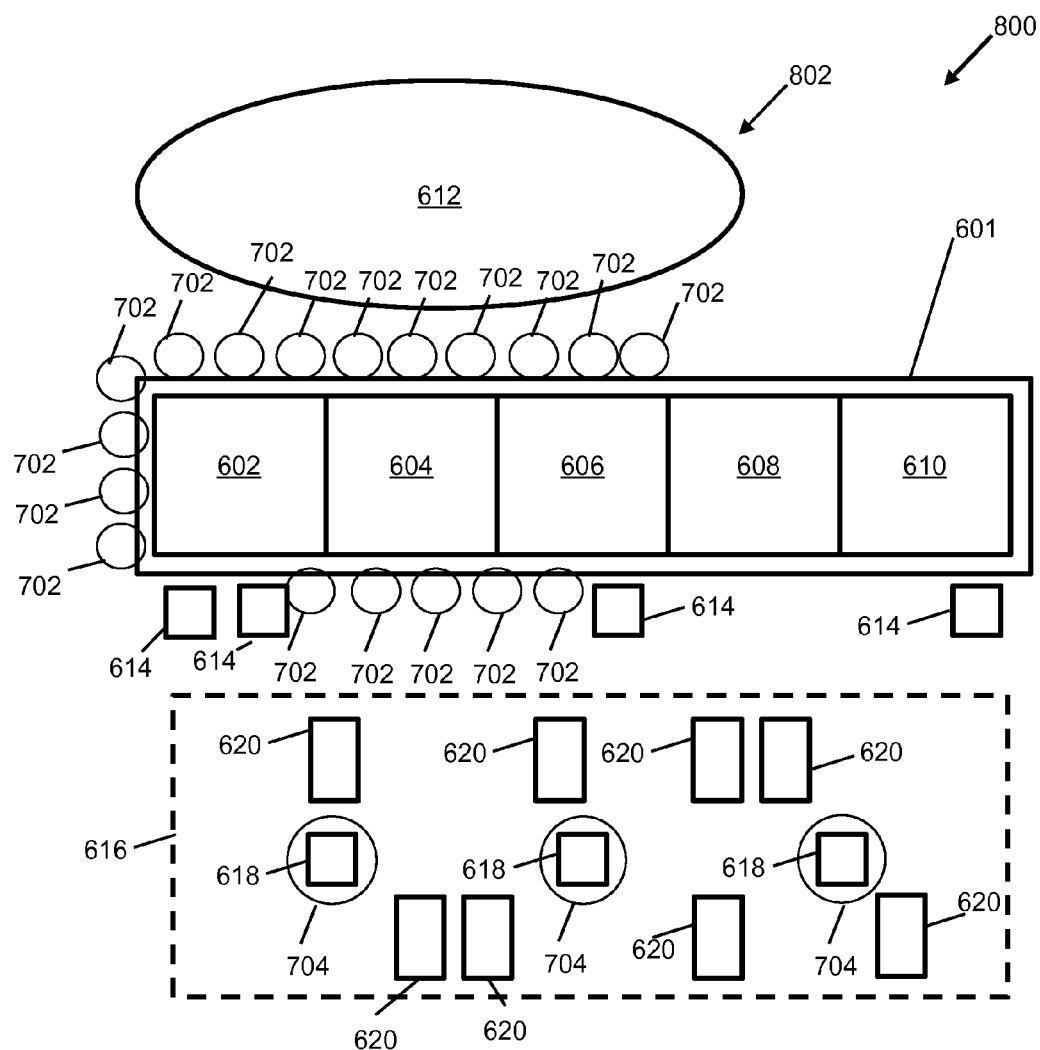

FIG. 8 is a simplified compound image 800 of satellite image 600 and satellite image 700. More specifically, imagery computing device 202 generates compound image 800 by overlaying satellite image 700 on satellite image 600. Accordingly, features such as the structure of real property location 601, pond 612, trees 614, and parking lot 606 are visible. Additionally, locations of lights 702 and 704 relative to such features are visible. Further, image 800 indicates that area 802 is dark at night because pond 612 is located in area 802, rather than because a vacant real property location is in area 802. Additionally, image 800 indicates that trees 614 occlude at least a portion of lights 702 that may otherwise be visible near unit 602. In some implementations, imagery computing device 202 receives a location identifier from a client computing device 204, such as an address of real property location 601, retrieves satellite image 600 and satellite image 700, generates compound image 800 by overlaying satellite image 700 onto satellite image 600, and causes client computing device 204 to display compound image 800 in a user interface, for example by transmitting compound image 800 to client computing device 800. As described above, in some implementations, client computing device 204 displays compound image 800 in a web browser or other client application upon receiving compound image 800 from imagery computing device 202. In some implementations, imagery computing device 202 generates a time-lapse video of multiple compound images 800 over a time period, such as multiple days, weeks, months, or years. Accordingly, the time-lapse video illustrates changes in the vacancy of real property location 601 over time.

Figure 9:
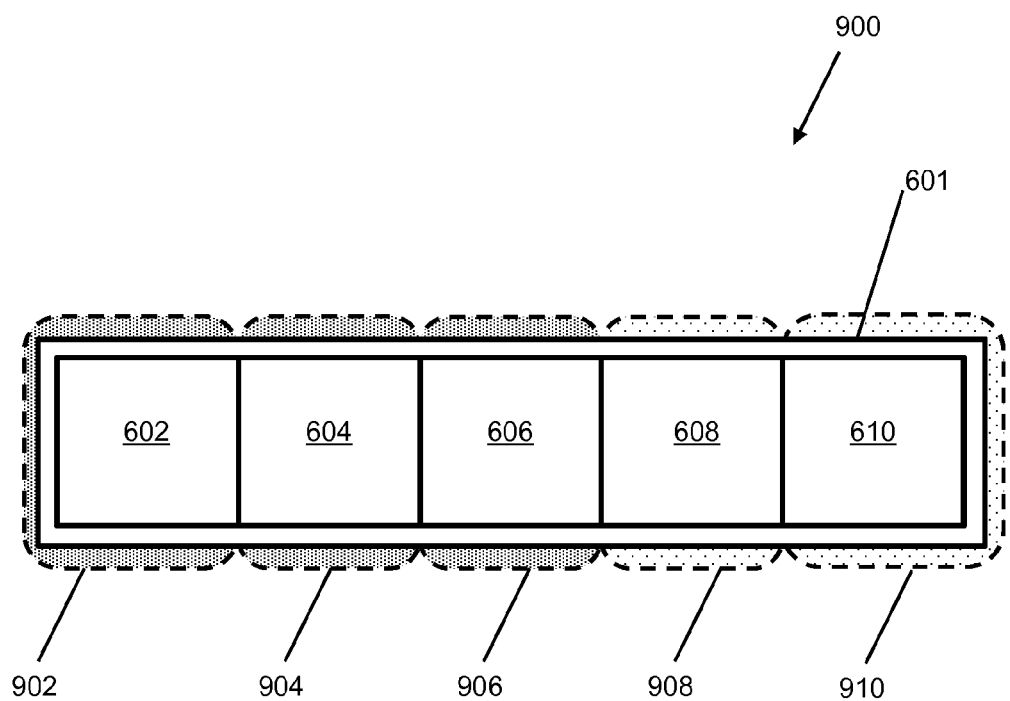

FIG. 9 is a simplified infrared satellite image 900 of real property location 601. Imagery computing device 202 receives image 900 from satellite image source 334 (FIG. 3) and stores image 900 in database 208 for later retrieval. Image 900 shows infrared radiation (i.e., heat) emitted from units 602, 604, 606, 608, and 610. In particular, infrared radiation 902, 904, and 906 from units 608 and 610 is of a higher energy than infrared radiation 908 and 910 emitted from units 608 and 610. A unit that accommodates a merchant is likely to experience a narrower range of temperatures than a vacant unit, to suit the needs of the merchant and the merchant's customers. That is, a merchant is likely to operate a heating and/or cooling system inside the merchant's unit. Accordingly, occupied units are likely to emit higher levels of infrared radiation than vacant units when the outside temperature is relatively cold (e.g., during the winter), and conversely, emit lower levels of infrared radiation than the vacant units when the ambient temperature is relatively hot (e.g., during the summer). Accordingly, in at least some implementations, imagery computing device 202 utilizes one or more infrared satellite images, such as image 900, of real property location 601 as an indication of whether one or more units of real property location 601 are vacant.

In some implementations, imagery computing device 202 causes one or more infrared satellite images 900 of real property location 601 to be displayed in a user interface, for example by transmitting one or more infrared satellite images 900 to a client computing device 204 for display thereon. In some implementations, imagery computing device 202 generates a time-lapse video of multiple infrared satellite images 900 of real property location 601. More specifically, such implementations capture information regarding infrared emission over time (i.e., same ambient temperature today and yesterday, but today the building is much warmer). Having multiple infrared satellite images 900 of the same real property location 601 over multiple days, weeks, or months, may increase the certainty of a conclusion that one or more units (e.g., units 602, 604, and 606) are kept within a narrower temperature range than the outside temperature, and that other units (e.g., units 608 and 610) are not, and therefore are likely to be vacant. In some implementations, imagery computing device 202 generates such a conclusion and transmits the conclusion to client computing device 204 for display thereon. In some implementations, imagery computing device 202 additionally determines an amount of solar energy absorbed by the real property location during the time period. More specifically, imagery computing device 202 multiplies solar irradiance (e.g., $W/m^2$) received by the real property location by the surface area of the real property location and by the time period to arrive at the solar energy (e.g., Watt-hours). Imagery computing device 202 calculates the solar irradiance ($W/m^2$) based at least in part on atmospheric conditions (e.g., cloud cover), a time of day, a time of year, a geographic location of the real property location (e.g., latitude and longitude), and a reflectivity of at least one surface of the real property location 601. More specifically, in at least some implementations, imagery computing device 202 determines the amount of solar irradiance absorbed by the real property location using a solar irradiance model, for example using the American Society of Civil Engineers (ASCE) Standardized Reference Evapotranspiration Equation. In some implementations, imagery computing device 202 factors in the determination of the amount of solar energy absorbed by real property location into a determination of whether an amount of heat (i.e., infrared energy) emitted from real property location 601 is greater or less than an expected amount (e.g., a predefine numeric value) for a unit that is not internally heated or cooled by a merchant operating a heating or cooling system.

Figure 10:
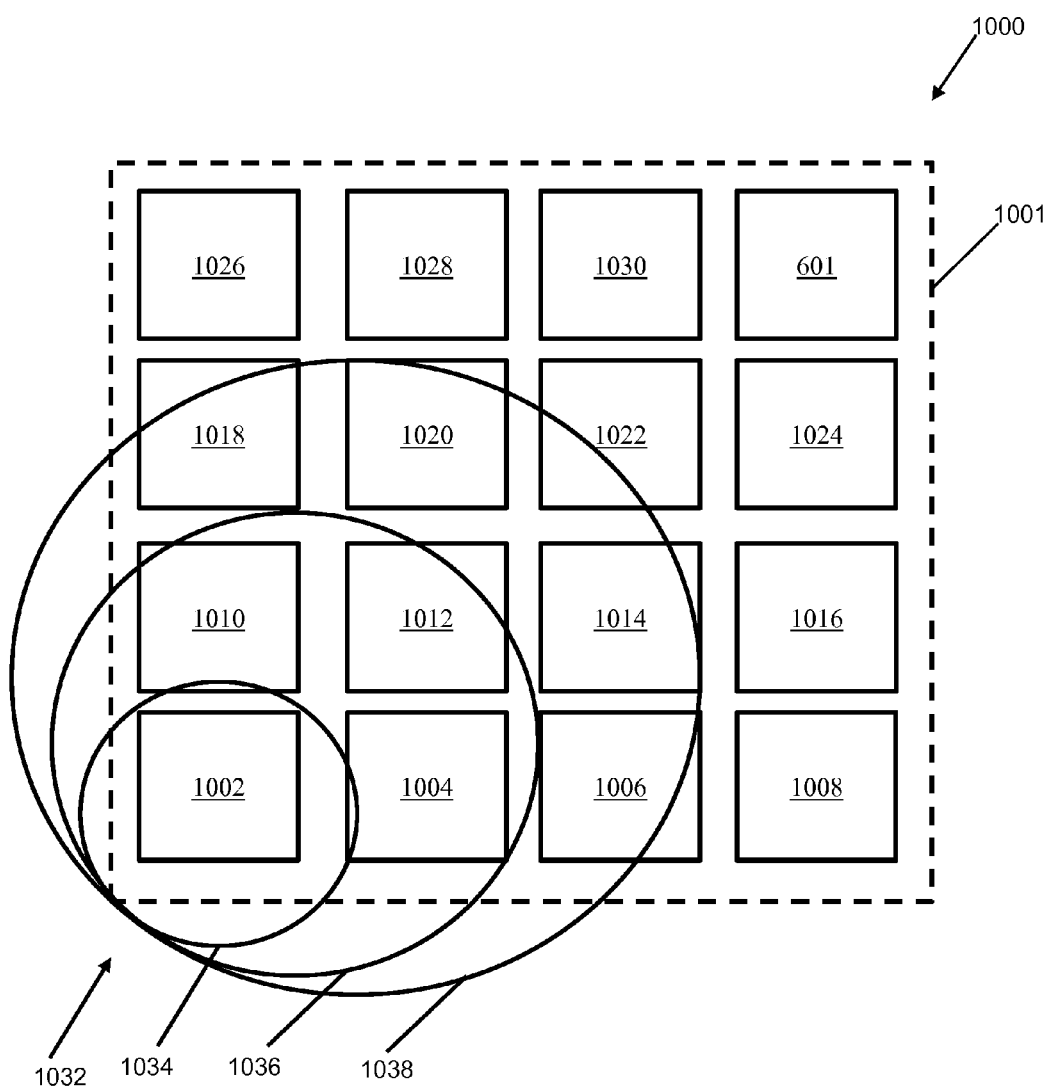

FIG. 10 is a diagram of a vacancy trend 1032 emerging in a geographic area 1001 that includes real property location 601. Geographic area 1001 includes a real property location 601, in addition to real property locations 1002, 1004, 1006, 1008, 1010, 1012, 1014, 1016, 1018, 1020, 1022, 1024, 1026, 1028, and 1030. In some implementations, imagery computing device 202 generates a time-series video 1000 that includes multiple daytime images 600, nighttime images 700, compound images 800, and/or infrared images 900 over a time period that spans multiple days, months, or years. Using the analysis described respect to images 600, 700, 800, and 900 above, trend 1032 in vacancies in geographic area 1001 is apparent. In some implementations, imagery computing device 202 transmits time-series video 1000 to a client computing device 204 for review and identification of trend 1032. In other implementations, imagery computing device 202 identifies trend 1032 and indicates trend 1032, for example graphically or textually. For example, in some implementations, imagery computing device 202 generates an outline 1034, 1036, and 1038 that changes in size and/or shape over the course of time-series video 1000, indicating real property locations that are vacant.

Outline 1034 indicates that, in a first portion of the time period, real property location 1002 was vacant. Outline 1036 indicates that, at a second, subsequent portion of the time period, real property locations 1002, 1004, 1010, and 1012 were completely or at least partially vacant. Further, outline 1038 indicates that in a third portion of the time period, subsequent to the first and second portions of the time period, real property locations 1002, 1004, 1010, 1012, 1006, 1014, 1018, and 1020 were completely or at least partially vacant. Based on trend 1032, an investor may choose not to invest in real property location 601 or, if the investor already owns real property location, the investor may choose to sell real property location 601 in the near future before trend 1032 reaches real property location 601.

Given that database 208 stores historical transaction data in addition to satellite images, imagery computing device 202, at least in some implementations, compares the historical transaction data to vacancy information indicated by one or more satellite images 600, 700, 800, 900, and 1000. More specifically, for example, imagery computing device 202 compares historical transaction data associated with unit 602 to satellite image 800 and/or satellite image 900 to confirm that a merchant (e.g., merchant 640) associated with an address of unit 602 is indeed submitting payment transactions (i.e., authorization request messages) through payment network 128 and/or verifies that no payment transactions were submitted from a merchant associated a unit (e.g., unit 610) that appears to be vacant. Additionally, in some implementations, imagery computing device 202 determines an average transaction amount, a transaction velocity (i.e., number of transactions in a given time period), a most recent transaction date, and/or other statistical information regarding merchants in one or more real property locations (e.g., real property location 601) and transmits all or a portion of such statistical information to a client computing device 204 in response to receiving a location identifier from the client computing device 204 for the real property location (e.g., real property location 601).

Figure 11:
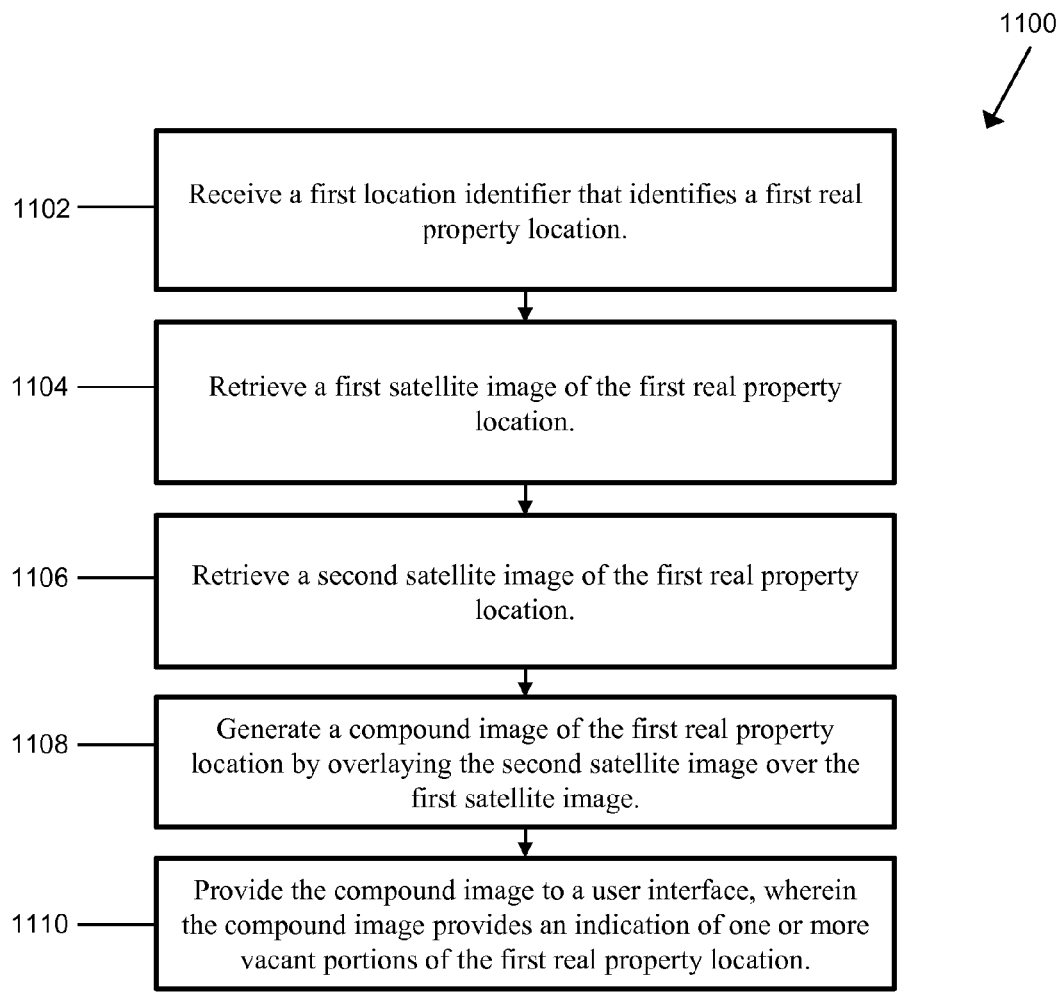

FIG. 11 is a flowchart of an example process 1100 implemented by imagery system 200 for detecting real estate vacancies using satellite imagery. Initially, imagery computing device 202 receives 1102 a first location identifier that identifies a first real property location (e.g., real property location 601). For example, a client computing device 204 associated with a potential investor transmits an address of real property location 601 to imagery computing device 202, which receives the address. Additionally, imagery computing device 202 retrieves 1104 a first satellite image (e.g., satellite image 600) of the first real property location (e.g., real property location 601), for example from database 208. Additionally, imagery computing device 202 retrieves 1106 a second satellite image (e.g., satellite image 700) of the first real property location (e.g., real property location 601), for example from database 208. More specifically, first satellite image 600 and second satellite image 700 are indexed in database 208 by location (e.g., physical address), thereby enabling imagery computing device 202 to retrieve satellite images 600 and 700 in response to receiving the first location identifier. Further, imagery computing device 202 generates 1108 a compound image (e.g., compound image 800) of the first real property location (e.g., real property location 601) by overlaying the second satellite image (e.g., satellite image 700) over the first satellite image (e.g., satellite image 600). Additionally, imagery computing device 202 provides 1110 the compound image (e.g., compound image 800) to a user interface. For example, imagery computing device 202 transmits compound image 800 to a client computing device for display thereon (e.g., in a web browser or client application). The displayed compound image (e.g., output image 800) provides an indication of one or more vacant portions of the first real property location (e.g., real property location 601), as described above.

In some implementations, imagery computing device 202 retrieves the first satellite image (e.g., satellite image 600) of the first real property location (e.g., real property location 601) by retrieving a daytime image of the real property location, and retrieves the second satellite image (e.g., satellite image 700) of the first real property location by retrieving a nighttime image of the real property location. In some implementations, imagery computing device 202 retrieves a plurality of infrared satellite images (e.g., multiple infrared satellite images 900) of the first property location (e.g., real property location 601) over a time period that includes multiple days, determines whether an amount of infrared energy (e.g., infrared radiation 902) radiated from the real property location (e.g., real property location 601) has changed over the time period, and determines whether an amount of vacancies associated with the real property location (e.g., real property location 601) has changed over the time period based at least in part on whether the amount of infrared energy (e.g., infrared radiation 902) has changed over the time period.

In some implementations, imagery computing device 202 determines an amount of solar energy absorbed by the real property location (e.g., real property location 601) during the time period, based at least in part on at least one of atmospheric conditions, a time of day, a geographic location of the real property location, and a reflectivity of at least one surface of the real property location, and determines whether the amount of vacancies has changed additionally based on the amount of solar energy absorbed by the real property location (e.g., real property location 601). In some implementations, imagery computing device 202 generates a time-lapse video of a geographic area (e.g., geographic area 1001) that includes the real property location (e.g., real property location 601) based on a plurality of satellite images, including the first satellite image (e.g., satellite image 600) and the second satellite image (e.g., satellite image 700). The time-lapse video indicates a trend (e.g., trend 1032) in vacancies associated with the geographic area (e.g., geographic area 1001). Additionally, in some implementations, imagery computing device 202 indicates that the trend (e.g., trend 1032) is increasing, decreasing, or constant.

In some implementations, imagery computing device 202 is in communication with a database (e.g., database 208) associated with a payment network (e.g., payment network 128), and imagery computing device 202 retrieves, from the database (e.g., database 208), transaction data associated with merchants located in the real property location (e.g., real property location 601) and determines whether vacancy information indicated by the compound image (e.g., compound image 800) is consistent with the transaction data. In some implementations, imagery computing device 202 additionally determines a number of units in the real property location (e.g., real property location 601) and compares a number of merchants associated with the real property location (e.g., real property location 601), based on the transaction data, to the number of units in the real property location (e.g., real property location 601). In some implementations, imagery computing device 202 generates a determination of the number of vacancies in the real property location, for example based on one or more of images 600, 700, 800, and 900.

In some implementations, imagery computing device 202 rasterizes the nighttime image (e.g., satellite image 700). In rasterizing the nighttime image, imagery computing device 202 partitions the nighttime image into a plurality of elements (e.g., pixels). Further, imagery computing device 202 assigns a single color or value to each element. Additionally, imagery computing device 202 counts the number of lighted up elements (e.g., pixels) adjacent to a given property (e.g., real property location 601). If the count of lighted adjacent elements (e.g., pixels) is greater than a predetermined threshold amount (e.g., 20%) of the perimeter length of the property (e.g., real property location 601), then imagery computing device 202 determines that the property (e.g., real property location 601) is not vacant. In at least some implementations, the predetermined threshold is chosen to account for the fact that some retailers, such as supermarkets, only have illuminated signage on one side of the property. In some implementations, imagery computing device 202 applies the above-described process to determining if a property is vacant using infrared radiation. In such implementations, rather than using one or more nighttime images of the property (e.g., nighttime image 700), imagery computing device 202 uses one or more images indicating differences in infrared emissions (e.g., today versus yesterday and/or one unit versus an adjacent unit).

Figure 12:
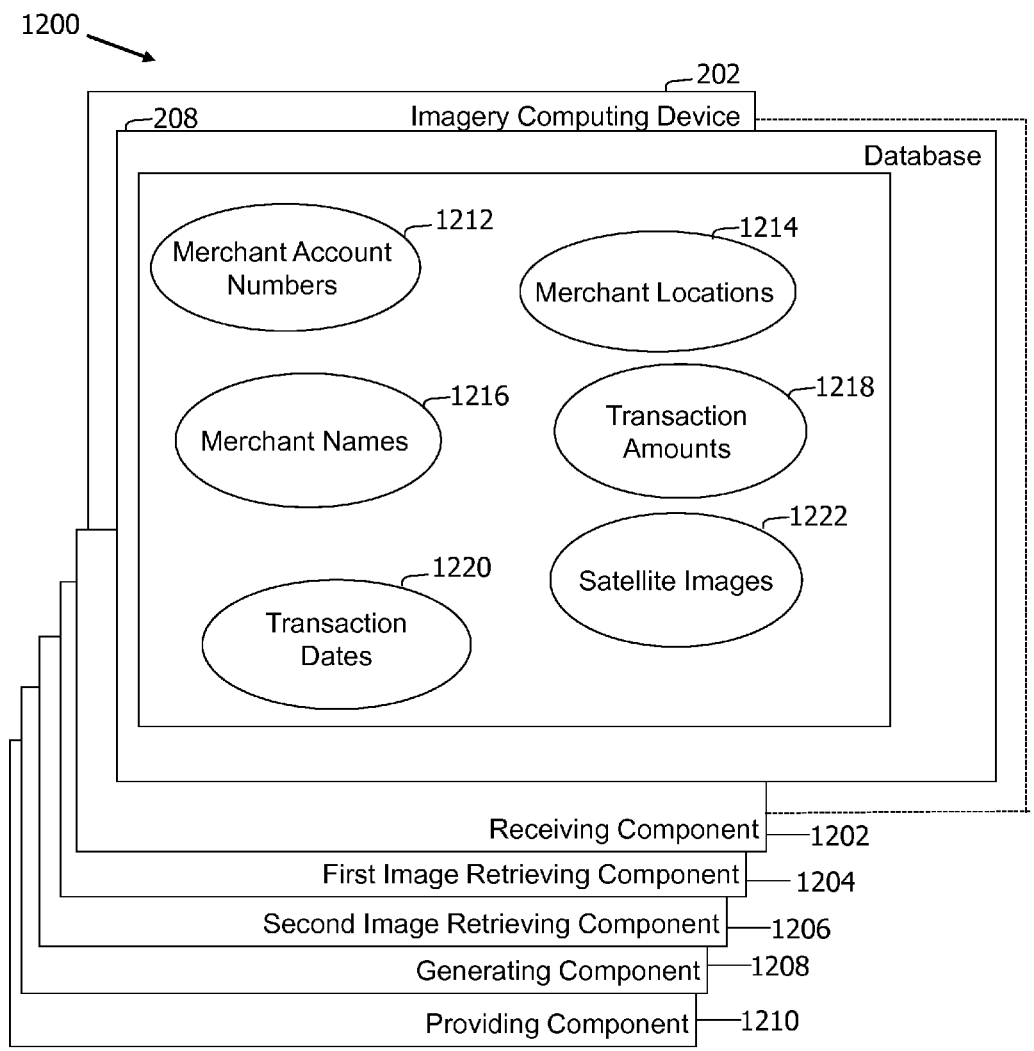

FIG. 12 is a diagram 1200 of components of one or more example computing devices, for example, imagery computing device 202, that may be used in embodiments of the described systems and methods. FIG. 12 further shows a configuration of database 208 (FIG. 2). Database 208 is coupled to several separate components within imagery computing device 202, which perform specific tasks.

Imagery computing device 202 includes a receiving component 1202 for receiving a first location identifier that identifies a first real property location. Imagery computing device 202 also includes a first image retrieving component 1204 for retrieving a first satellite image of the first real property location. Imagery computing device 202 additionally includes a second image retrieving component 1206 for retrieving a second satellite image of the first real property location. Additionally, imagery computing device 202 includes a generating component 1208 for generating a compound image of the first real property location by overlaying the second satellite image over the first satellite image. Additionally, imagery computing device 202 includes a providing component 1210 for providing the compound image to a user interface, wherein the compound image provides an indication of one or more vacant portions of the first real property location.

In an example embodiment, database 208 is divided into a plurality of sections, including but not limited to, a merchant account numbers section 1212, a merchant locations section 1214, a merchant names section 1216, a transaction amounts section 1218, a transaction dates section 1220, and a satellite images section 1222. These sections within database 208 are interconnected to retrieve and store information in accordance with the functions and processes described above.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 405, 504, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

The above-described embodiments of a method and system for detecting real estate vacancies using satellite imagery (a) provide information to an investor regarding an amount of vacancies in one or more real property locations and (b) do not require physically visiting the real property location. As a result, the methods and systems described herein provide an investor with information that enables the investor make an informed investment decision regarding one or more real property locations in a more convenient manner than would be provided by conventional systems and methods. It should be understood that certain embodiments of the disclosure may be used to estimate values for real property locations other than strip malls, including both commercial and residential real property locations.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for detecting real estate vacancies using satellite imagery, said method implemented using a computing device in communication with a memory, said method comprising:
   receiving, by the computing device, a first location identifier that identifies a first real property location;
   retrieving, by the computing device, a plurality of satellite images of the first real property location, wherein the plurality of images include at least i) a first satellite image, ii) a second satellite image, and iii) a plurality of infrared satellite images captured during a time period;
   determining a change in an amount of infrared energy radiated from the first real property location during the time period based in part on the plurality of infrared satellite images;
   determining a change in vacancies associated with the first real property location during the time period based at least in part on changes in the amount of infrared energy radiated during the time period;
   generating, by the computing device, a compound image of the first real property location by overlaying the second satellite image over the first satellite image; and
   providing an indication of the change in vacancies associated with the first real property and the compound image to a user interface, wherein the compound image provides an indication of one or more vacant portions of the first real property location.

2. The method of claim 1, wherein retrieving the first satellite image of the first real property location further comprises retrieving a daytime image of the first real property location and retrieving the second satellite image of the first real property location further comprises retrieving a nighttime image of the first real property location.

3. The method of claim 1, wherein the plurality of infrared satellite images includes the first satellite image and the second satellite image, and wherein the plurality of infrared satellite images are captured during the time period that includes multiple days.

4. The method of claim 1, further comprising:
   determining an amount of solar energy absorbed by the first real property location during the time period, based at least in part on at least one of atmospheric conditions, a time of day, a geographic location of the first real property location, and a reflectivity of at least one surface of the first real property location; and
   determining whether the amount of vacancies has changed based additionally on the amount of solar energy absorbed by the first real property location.

5. The method of claim 1, further comprising generating a time-lapse video of a geographic area that includes the first real property location based on a plurality of satellite images, including the first satellite image and the second satellite image, wherein the time-lapse video indicates a trend in vacancies associated with the geographic area.

6. The method of claim 5, further comprising indicating that the trend is increasing, decreasing, or constant.

7. The method of claim 1, wherein the computing device is in communication with a database associated with a payment network, said method further comprising:

retrieving, from the database, transaction data associated with merchants located in the first real property location; and determining whether vacancy information indicated by the compound image is consistent with the transaction data.

8. The method of claim 7, further comprising:

determining a number of units in the first real property location; and comparing a number of merchants associated with the first real property location, based on the transaction data, to the number of units in the first real property location.

9. The method of claim 1, further comprising generating a determination of the number of vacancies in the first real property location.

10. An imagery computing device for detecting real estate vacancies using satellite imagery, the imagery computing device comprising a processor coupled to a memory, said imagery computing device configured to:

receive a first location identifier that identifies a first real property location;

retrieve a plurality of satellite images of the first real property location, wherein the plurality of images include at least i) a first satellite image, ii) a second satellite image, and iii) a plurality of infrared satellite images captured during a time period;

determine a change in an amount of infrared energy radiated from the first real property location during the time period based in part on the plurality of infrared satellite images;

determine a change in vacancies associated with the first real property location during the time period based at least in part on changes in the amount of infrared energy radiated during the time period;

generate a compound image of the first real property location by overlaying the second satellite image over the first satellite image; and provide an indication of the change in vacancies associated with the first real property and the compound image to a user interface, wherein the compound image provides an indication of one or more vacant portions of the first real property location.

11. The imagery computing device of claim 10, further configured such that retrieving the first satellite image of the first real property location further comprises retrieving a daytime image of the first real property location and retrieving the second satellite image of the first real property location further comprises retrieving a nighttime image of the first real property location.

12. The imagery computing device of claim 10, wherein the plurality of infrared satellite images includes the first satellite image and the second satellite image, and wherein the plurality of infrared satellite images are captured during the time period that includes multiple days.

13. The imagery computing device of claim 10, further configured to:

determine an amount of solar energy absorbed by the first real property location during the time period, based at least in part on at least one of atmospheric conditions, a time of day, a geographic location of the first real property location, and a reflectivity of at least one surface of the first real property location; and determine whether the amount of vacancies has changed based additionally on the amount of solar energy absorbed by the first real property location.

14. The imagery computing device of claim 10, further configured to generate a time-lapse video of a geographic area that includes the first real property location based on a plurality of satellite images, including the first satellite image and the second satellite image, wherein the time-lapse video indicates a trend in vacancies associated with the geographic area.

15. The imagery computing device of claim 14, further configured to indicate that the trend is increasing, decreasing, or constant.

16. The imagery computing device of claim 10, wherein said imagery computing device is in communication with a database associated with a payment network, said imagery computing device further configured to:

retrieve, from the database, transaction data associated with merchants located in the first real property location; and determine whether vacancy information indicated by the compound image is consistent with the transaction data.

17. The imagery computing device of claim 16, further configured to:

determine a number of units in the first real property location; and compare a number of merchants associated with the first real property location, based on the transaction data, to the number of units in the first real property location.

18. The imagery computing device of claim 10, further configured to generate a determination of the number of vacancies in the first real property location.

19. A non-transitory computer-readable storage medium having computer-executable instructions embodied thereon, wherein when executed by an imagery computing device having at least one processor coupled to a memory, the computer-executable instructions cause the imagery computing device to:

receive a first location identifier that identifies a first real property location;

retrieve a plurality of satellite images of the first real property location, wherein the plurality of images include at least i) a first satellite image, ii) a second satellite image, and iii) a plurality of infrared satellite images captured during a time period;

determine a change in an amount of infrared energy radiated from the first real property location during the time period based in part on the plurality of infrared satellite images;

determine a change in vacancies associated with the first real property location during the time period based at least in part on changes in the amount of infrared energy radiated during the time period;

generate a compound image of the first real property location by overlaying the second satellite image over the first satellite image; and provide an indication of the change in vacancies associated with the first real property and the compound image to a user interface, wherein the compound image provides an indication of one or more vacant portions of the first real property location.

20. The non-transitory computer-readable storage medium of claim 19, wherein the plurality of infrared satellite images includes the first satellite image and the second satellite image, and wherein the plurality of infrared satellite images are captured during the time period that includes multiple days.

* * * * *